Patented June 11, 1929.

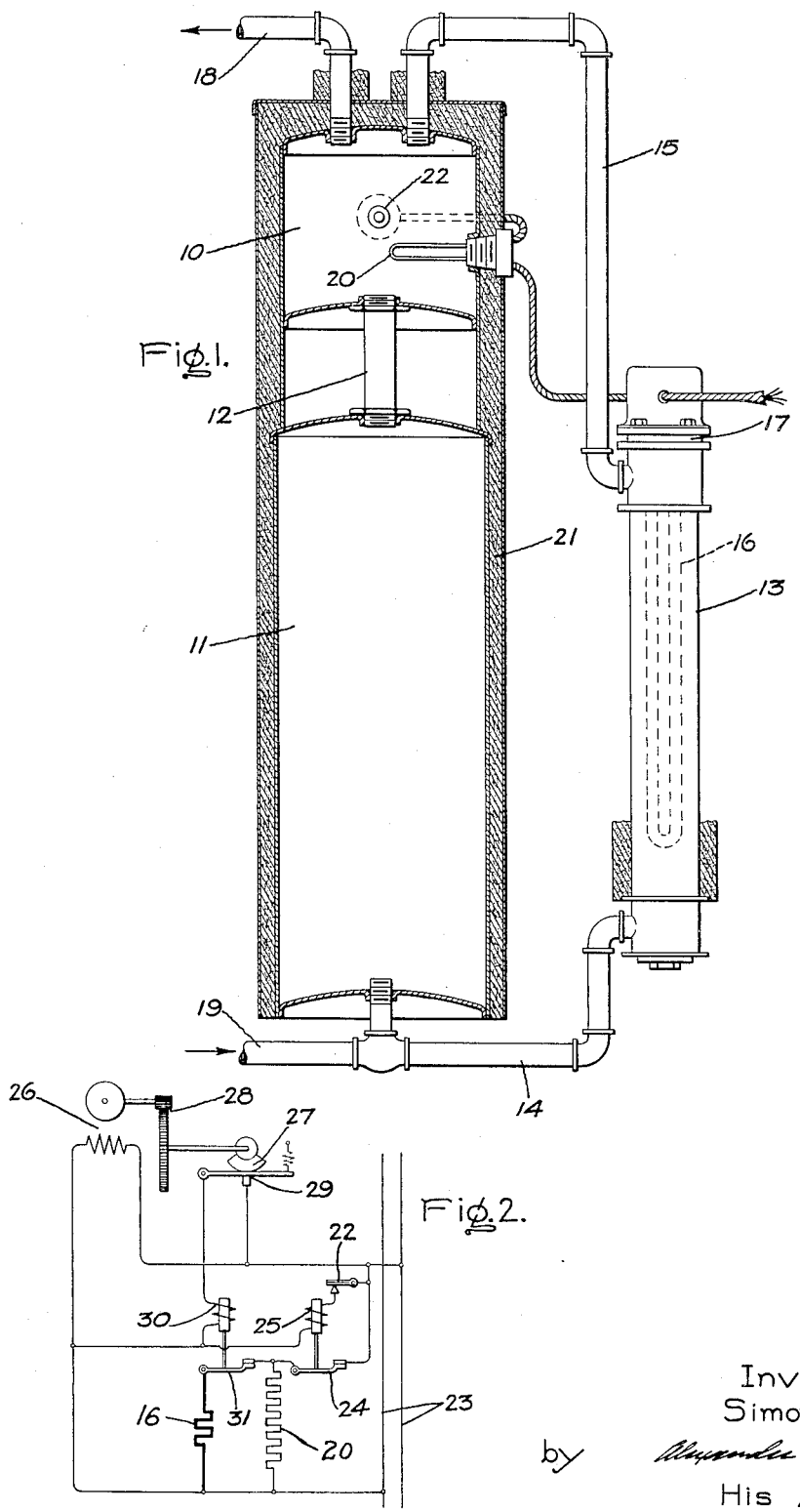

1,717,207

UNITED STATES PATENT OFFICE.

SIMON HALLE, OF COLORADO SPRINGS, COLORADO, ASSIGNOR TO EDISON ELECTRIC APPLIANCE COMPANY, OF CHICAGO, ILLINOIS, A CORPORATION OF NEW YORK.

ELECTRIC WATER HEATER.

Application filed December 28, 1927. Serial No. 243,119.

My invention relates to electric water heaters, more particularly to electric heaters of the storage type, and has for its object the provision of means whereby a small quantity of water is maintained hot at all times and a relatively large quantity of water is heated and stored during periods of relatively light load on the electrical supply circuit.

In carrying out my invention in one form I provide two storage tanks for the water, one tank being of relatively large size and the other being of relatively small size. The small tank is arranged above the larger tank and the two are connected through a conduit. A circulation type water heater of large capacity is provided for heating the water in both tanks and a second heater of small capacity is provided for the small tank alone. The two heaters are controlled by means responsive to the temperature of the water in the small tank and the circulation heater is controlled by timing mechanism whereby this heater is disconnected during periods of heavy load on the electrical supply circuit.

For a more complete understanding of my invention reference should be had to the accompanying drawing in which Fig. 1 is a view mainly in section of an electric water heater embodying my invention, while Fig. 2 is a diagrammatic view illustrating the control means for the heaters.

Referring to the drawing, in one form of my invention I provide storage means for the water comprising two receptacles or tanks, an upper tank 10 of relatively small size and a lower tank 11 of relatively large size. These tanks are connected together by means of a pipe 12 which communicates with the tank 11 at the top thereof and with the tank 10 at the bottom thereof. The water in the two tanks can be heated by means of an electric water heater of a circulation type comprising a jacket 13 which may be tubular in form. This jacket is mounted in a vertical position and has its lower end connected to the lower end of the tank 11 through a pipe 14 and its upper end connected to the upper end of the tank 10 through a pipe 15. The water in the jacket 13 is suitably heated, for example, by means of an electric heater 16 of the immersion type which may consist of a hairpin-shaped length of sheathed resistance wire having its ends connected to a screw plug support 17 as described and claimed in Patent No. 1,522,992 to Abbott, dated January 13, 1925. This heater may be inserted in the top of the casing and the plug screwed tightly in a threaded opening in the casing.

It will be understood that in the operation of the heater 16 the water heated in the casing by contact with the heater rises and flows through pipe 15 into the upper tank 10, the hot water being replaced by cold water entering the casing through the pipe 14. A circulation of water is thus produced and the hot water accumulating at the top gradually fills the upper tank 11 until the water in both tanks has been heated. Hot water may be withdrawn from the upper tank 10 through an outlet pipe 18 connected with the top thereof. Cold water is supplied to the tanks through an inlet pipe 19 communicating with the bottom of the tank 11. This pipe may be connected to a suitable supply of water, such as the city water main.

A second electric heater 20 is provided, this heater being installed in the upper tank 10. As shown, this heater is similar to the heater 17 but it is of much smaller heat generating capacity. It is inserted through a tapped hole in the side of the tank 10 and secured by securing its plug support in this hole. The capacity of the heater 20 is suitable to heat the water in the upper tank 10 only. In fact, it would be practically impossible for this heater to heat any considerable amount of water in the tank 11 due to the restricted communication between the tanks afforded by the pipe 12 and, furthermore, due to the fact that the heater 12 is above the tank 11. Any heating below this heater must necessarily take place due to conduction, since there will be no circulation of water between the tanks when this heater alone is operating. It is contemplated that the heater 20 will maintain the water in the tank 10 hot at all times. Both tanks are provided with suitable heat insulation 21, although this insulation is heavier around the tank 10 since hot water will always be present in this tank.

For the control of the two heaters, a suitable thermostat 22 is provided which is mounted in the tank 10 so as to be responsive to the temperature of the water therein. Referring to Fig. 2, the circuit to the two heaters from an alternating current electrical supply source 23 is controlled by means of a switch 24 operated by a coil 25. The circuit of this coil 25 is controlled by the thermostat 22 so that when the water in the upper tank 10 reaches a predetermined high temperature the coil 25 is deenergized and switch 24 opened to disconnect the heaters. The switch 24 is closed by the thermostat when the temperature of the water falls to a predetermined low value and in this way a predetermined mean temperature of the water is maintained.

Auxiliary time responsive control means is also provided for the large heater 16. As shown this time mechanism comprises a constant speed induction motor 26 which is connected to the supply circuit 23. This motor drives a cam 27 through suitable reduction gearing 28, which cam opens and closes switch 29 in series with an operating coil 30. The coil 30 actuates a switch 31 in circuit with the heater 16. It is contemplated that the cam 27 will be rotated through a complete revolution once every 24 hours, the cam being arranged to maintain the switch 29 closed during the period of light load on the supply circuit at night, for example, from 10 p. m. to 6 a. m., whereby the switch 31 is maintained closed during this period.

In the operation of the system, as soon as the switch 31 is closed by the cam 27 both heating units come under the control of the thermostat and when the water in the upper tank 10 reaches a sufficient low temperature to cause the thermostat to close switch 24, both heaters are energized. This produces a circulation of water through the two tanks in series due to the effect of the heater 16, as previously described. This heater is so designed as to capacity with respect to the rate of flow of water allowed by the pipes 14, 15 and the water jacket, that with cold water entering the bottom of the jacket from the tank 11, the hot water leaving the jacket will be considerably below the temperature at which the thermostat 22 is adjusted to open the heating circuits. At the beginning of the operation of the circulation heater, therefore, the water in the tank 10 may be reduced in temperature somewhat due to the admission of water of lower temperature from the circulation heater. The heating continues however mainly due to the action of the circulation heater, the effect of the heater 20 being relatively insignificant, and finally both tanks 10 and 11 will be filled with hot water at the predetermined desired temperature at which the thermostat is set whereupon the thermostat will open the heating circuit and disconnect both heaters. It will be understood, of course, that there will be a certain temperature gradient in the water, the temperature gradually increasing from the bottom to the top. The thermostat 22 which is located in the vicinity of the hottest water is therefore arranged to operate at a temperature which is high enough to assure a desirable high temperature in the bottom of the tank 11. During the period of light load on the supply circuit the tank 11 is thus heated and hot water thereby stored for use during periods when the circulation heater is disconnected by the time mechanism.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the annexed claims.

What I claim as new and desire to secure by Letters Patent of the United States, is:—

1. An electric water heater comprising two tanks arranged one above the other, a conduit connection between said tanks, means for heating the water in the upper tank, means for heating the water in both of said tanks, and means responsive to the temperature of the water in the upper tank for controlling both of said heaters concurrently.

2. An electric water heater comprising two tanks arranged one above the other, a conduit connection between said tanks, means for heating the water in the upper tank, means exterior to said tanks for heating the water in both of said tanks, and time control means for the latter of said heaters.

3. An electric water heater comprising two tanks arranged one above the other, a conduit connection between said tanks, an electric heater for the upper tank, an external circulation electric heater for both of said tanks, an electric supply source for said heaters, and means for disconnecting the latter of said heaters during periods of heavy load on said supply source 4. An electric water heater comprising a relatively small tank, a relatively large tank, a conduit connection between said tanks. means for heating the water in said small tank only, means for heating the water in both of said tanks, means responsive to the temperature of the water in said small tank for controlling both of said heaters concurrently, and time control means for the latter of said heaters.

5. An electric water heater comprising a relatively large storage tank, a relatively small storage tank arranged above said large storage tank, a conduit connecting said tanks, an electric heater for said small tank, a circulation type heater for both of said tanks, an electric supply source for said heaters, and means for disconnecting said circulation heater during periods of heavy load on said supply source.

6. An electric water heater comprising a relatively large storage tank, a relatively small storage tank arranged above said large storage tank, a conduit connecting the top of said large tank with the bottom of said small tank, an electric heater of relatively small capacity in said small tank, an electric circulation water heater connected to the bottom and top of said large and small tanks respectively, a thermostat in said small tank for controlling both of said heaters concurrently, and time control mechanism for said circulation heater.

In witness whereof, I have hereunto set my hand this 21st day of December, 1927.

SIMON HALLE.